Aug. 28, 1962 YOSHIHIRO SHIMULA ETAL 3,051,834
AUTOMATIC RECORDING SYSTEM OF X-RAY DIFFRACTION PATTERNS
Filed Sept. 16, 1959 4 Sheets-Sheet 1
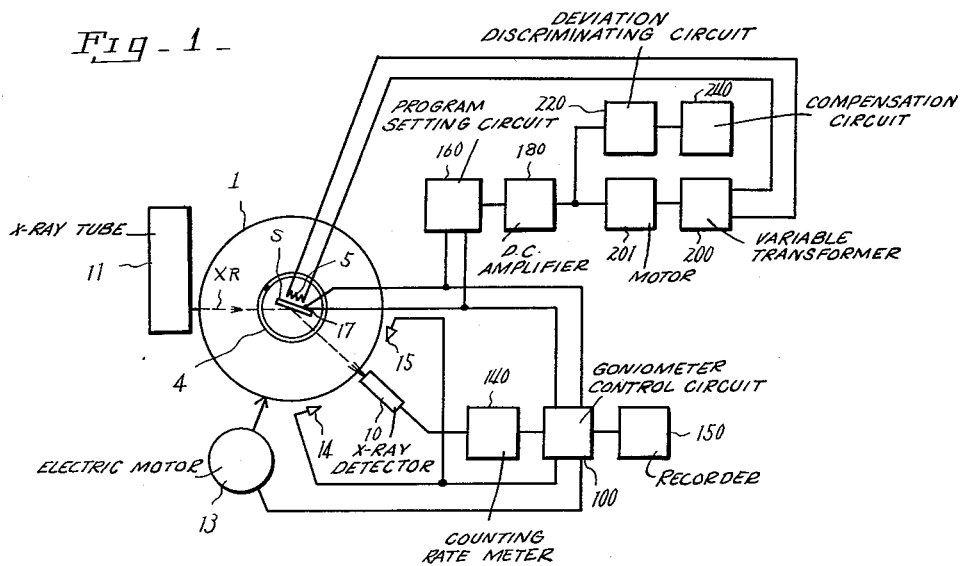
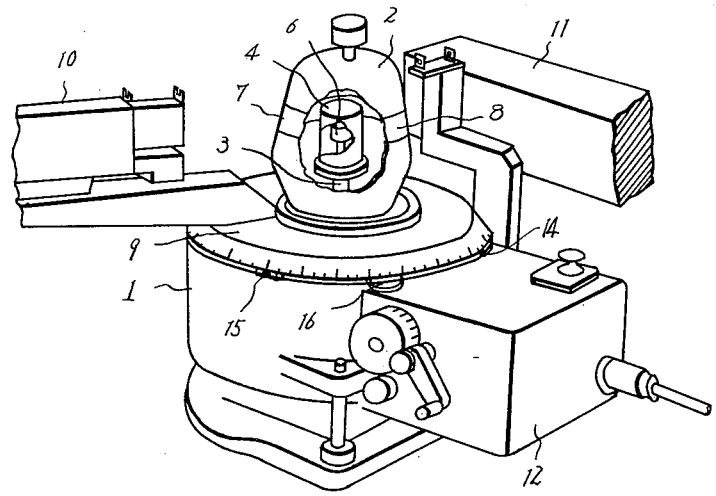

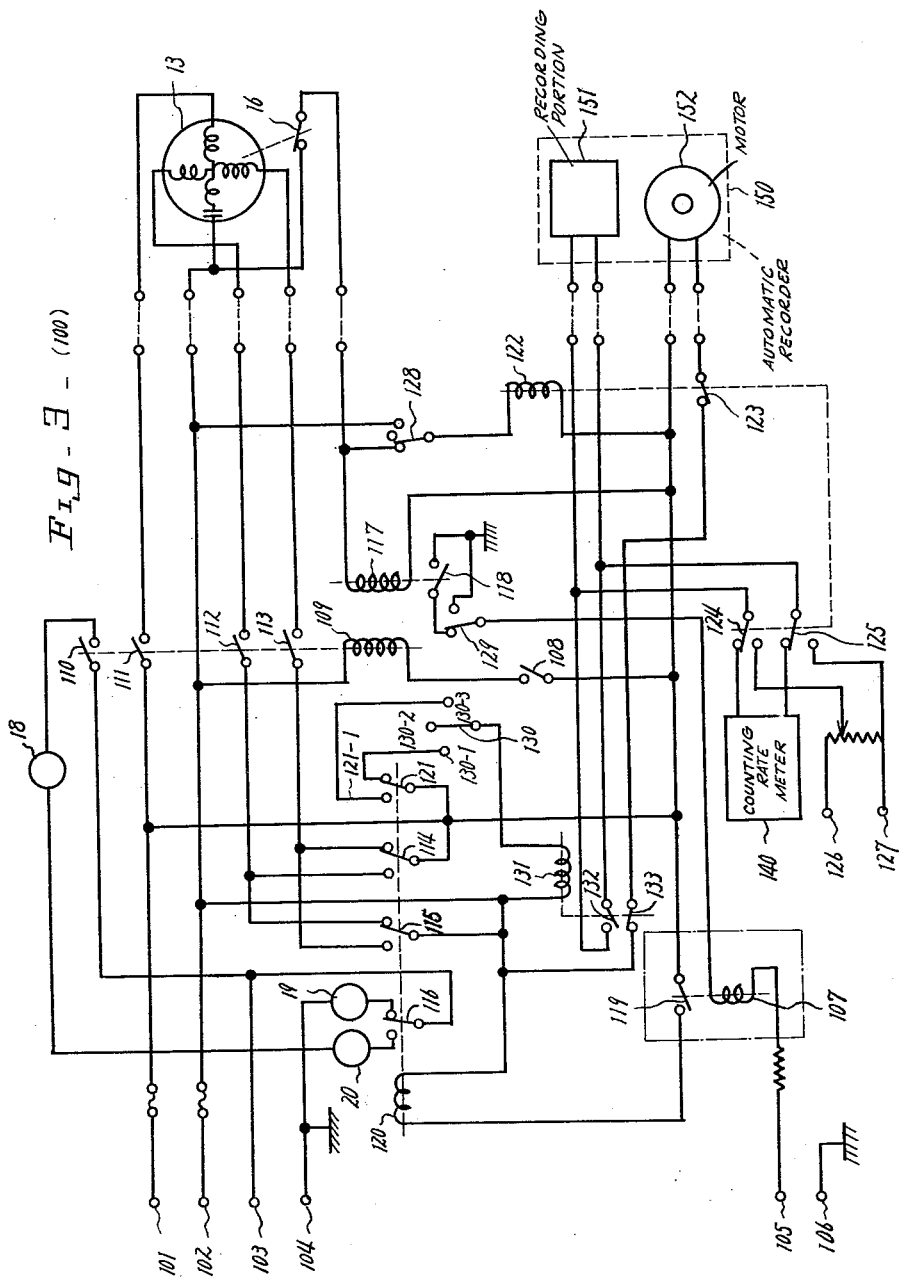

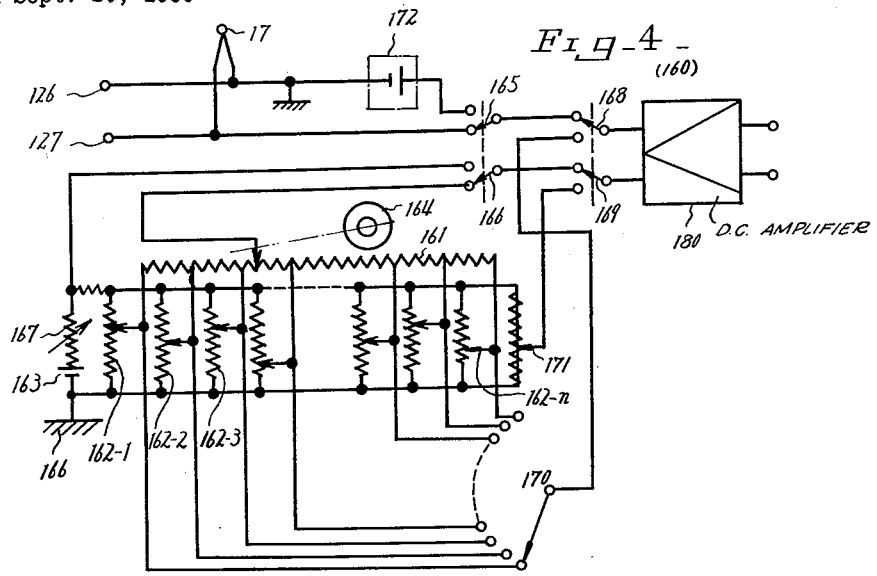
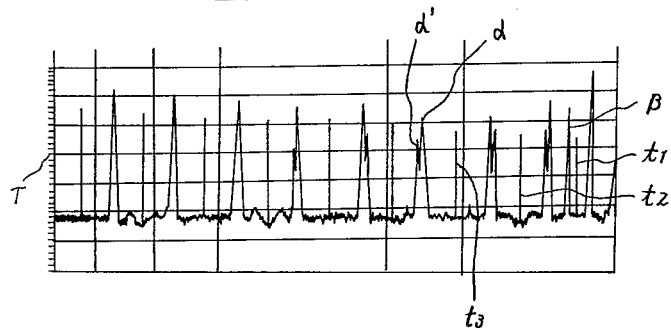
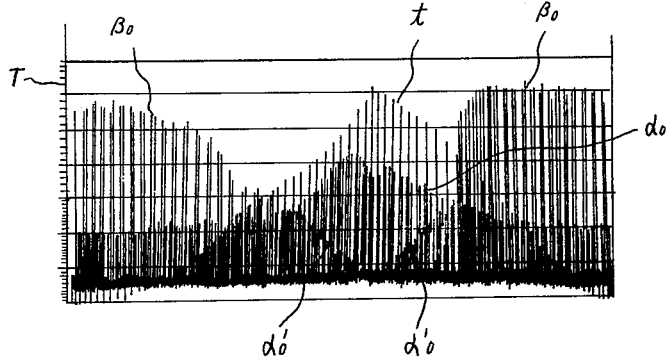

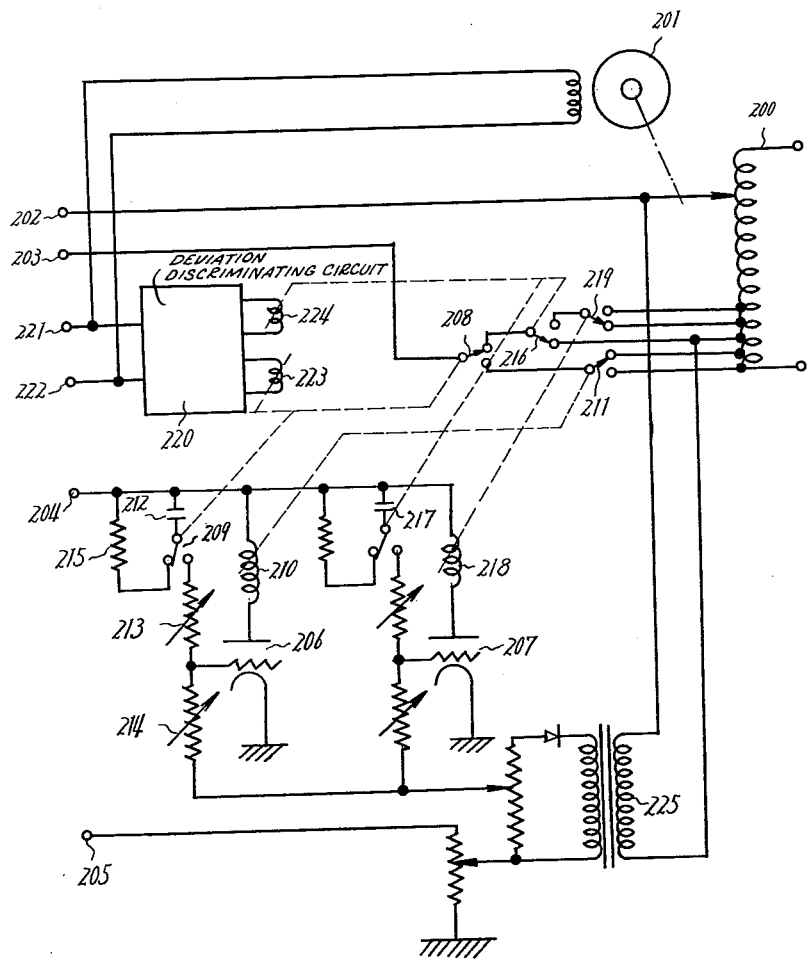
Fig-5-

United States Patent Office 3,051,834
Patented Aug. 28, 1962

3,051,834
AUTOMATIC RECORDING SYSTEM OF X-RAY DIFFRACTION PATTERNS
Yoshihiro Shimula, 19 Tenjincho, Nakano-ku, and Hiroshi Uchida, Room 203, Bldg. 71, Tamadaira-Danchi, 540-1 Hino-machi, Minamitama-gun, both of Tokyo, Japan
Filed Sept. 16, 1959, Ser. No. 840,348
4 Claims. (Cl. 250—51.5)

The present invention relates to an automatic recording system of X-ray diffraction patterns, more particularly to a system for recording continuously the changing state of the X-ray diffraction patterns while the sample temperature is changing continuously and for indicating the sample temperature on the same recording chart paper at the same time.

By irradiating samples such as metals with X-rays, it is possible to investigate the crystal structure of the sample by analyzing the relation between the incident angle and the intensity of diffracted X-rays. For these purposes, the pattern showing the relation between the incident angle of the X-rays on the sample and the intensity of the diffracted X-rays is automatically recorded by means of a diffractometer using a goniometer, Geiger counter or the like. In conventional procedure, the goniometer is combined with an X-ray detector and the sample is placed at the center of the X-ray goniometer and the detector and the sample are rotated by suitable means at angular velocities in the ratio of 1:2. The sample is irradiated by the X-rays from the goniometer and the X-rays which are diffracted from the surface of the sample are directed on a window of the detector in accordance with Bragg-Brentano method.

In such a method, it is necessary to change the sample temperature continuously and to observe the patterns at different temperatures in order to determine the transition state in the peak portion of the diffracted rays in order to analyze the crystal structure of the sample at elevated temperature.

It is a principal object of the present invention to provide a system for recording the diffraction pattern of the sample together with indicia representing the sample temperature.

It is a further object of the present invention to provide an apparatus for recording the diffraction pattern which shows directly the profile or the position of peaks in response to the change of the sample temperature and which also shows the temperature change of the sample on the same recording chart paper.

According to the system of the present invention, the sample temperature is continuously changed and the angle of incident X-ray to the sample is repeatedly changed, the output of a detector of diffracted beams from the sample is applied to an automatic recorder through electronic circuits during the time while the angle of incident X-ray beams are continuously changed in the same direction and in an instant when the travelling direction of X-ray detector is reversed. The output of a thermocouple which measures the sample temperature is furnished to the aforementioned automatic recorder, via the system of the present invention. Accordingly, in the present invention, the diffraction pattern which is illustrated by the angle between the incident X-ray beams and the diffracted beams on one axis on the chart paper and by the intensity of the diffracted beams from the sample on the other axis on the paper, the profile of the pattern is gradually changed in accordance with the temperature change of the sample and temperature mark lines which show the sample temperature are recorded on the pattern. If the changing rate of the incident angle is constant, the axis which corresponds to the angle between incident beams and diffracted beams indicates a time axis, and therefore, a temperature curve can be obtained by connecting peak points of the above temperature mark lines. From this the sample temperature known from the respective position in the diffracted pattern may be directly determined with accuracy by means of the level of the temperature curve.

When the feeding of the recording paper is carried on slowly, the peaks of the diffraction pattern are respectively drawn as straight lines, and these straight lines will be indicated on the recording paper close to each other and the temperature lines mentioned above will be drawn on the paper close to each other in straight lines.

In accordance with the change of the sample temperature, the level of the temperature lines will also be changed, if there are rises and falls of the peaks in the pattern. The lines showing the peaks will change in height, and a variety of mountain-shaped patterns may be drawn in groups of such lines with half-tone as seen in FIG. 7. Since one of the mountain-shaped patterns shows the sample temperature whereas the others show the peaks in the diffraction pattern, it is easy to concisely observe the state of change of the intensity of the diffracted beam from the sample from these profiles of the diffraction pattern.

In order to effect the above mentioned observation, it is necessary to provide an automatic control apparatus for controlling the temperature of the sample in response to the optional program. For this purpose, in the program setting circuit according to the present invention the ends of a plurality of variable resistors are parallelly connected to a common electric source, and the slide conductor of the variable resistors are connected to taps of a principal variable resistor which has a slidable conductor driven by a constant speed motor. Thus, the electric power to be applied to the heater of the sample is automatically controlled so that the output voltage of the temperature detector mounted on the sample may always be equal to the voltage of the above principal slide conductor.

In order that the invention may be more readily understood and carried into effect, the invention is hereinafter described by way of example and with reference to the accompanying drawings, in which;

FIG. 1 shows a schematic diagram of an X-ray diffractometer including the system relating to the present invention and a block diagram connected thereto;

FIG. 2 shows a view in perspective, showing the goniometer on which the sample heating apparatus is mounted, a part of which is cut away in order to show the inner portion thereof;

FIG. 3 is a wiring diagram of a controlling circuit for a recorder and the goniometer;

FIG. 4 is a wiring diagram illustrating a program setting circuit in the system according to the invention;

FIG. 5 shows a power controlling circuit for heating a sample in the system according to the present invention;

FIG. 6 shows an example of diffraction pattern and temperature mark lines recorded in accordance with the system of the invention; and FIG. 7 shows a further example of diffraction pattern and temperature mark lines recorded in accordance with the system of the invention with a slow feed of chart paper.

Referring to the drawings in detail, and in particular to FIGS. 1 and 2, an airtight casing 2 is centrally mounted on a goniometer 1. A radiation shielding casing 4 is mounted on a shaft 3 of the goniometer and extends into the airtight casing 4. A sample S is supported inside a heating device 6 constituted by a heating wire 5 and heat-proof insulating material in the radiation shielding casing 4. Openings or windows 7 and 8 are provided in the casing 2. The openings are covered by metal foil, through which X-ray beams pass. The foil may be aluminum foil or nickel foil. The openings and foil coverings are respectively provided in the radiation shielding casing 4. At a periphery of a rotation disk 9 of the goniometer a suitable X-ray detector 10 such as a Geiger-Müller counter tube is provided. An X-ray tube 11 is fixed to the side portion of the goniometer and an electric motor 13 is mounted in the casing 12 positioned outside of the goniometer. The shaft 3 of the goniometer and the detector 10 are rotated at the rotation ratio 1:2 by means of the motor 13 and a suitable gear mechanism. Accordingly if the sample is mounted on the shaft 3 so that the surface of the sample S is set on a straight line with the X-ray tube, the beams from the X-ray tube, as shown in dotted line $X_R$, are incident to the surface of the sample S and a diffracted beam is directed on the incident window of the detector 10, thereby satisfying the Bragg-Brentano equation regardless of the rotation angle of the goniometer.

Two limit stoppers 14 and 15 are provided on the rotatable disk 9 of the goniometer 1. A limit switch 16 is fixed to the casing 12 between the limit stoppers. Stoppers 14 and 15 are adjustable and may be moved to desired position and thereat fixed by means of suitable screws provided along the periphery of the rotatable disk of the goniometer. In accordance with the fixed position of these stoppers the incident angle is limited to the desired X-ray diffraction pattern for the sample.

When the stopper 14 or 15 contacts the limit switch 16 according to the rotation of the goniometer 1, a signal is transmitted through the limit switch to the goniometer control circuit 100. The polarity of the voltage applied to the motor 13 is converted by the control circuit 100 in accordance with the signal, and the goniometer is reversed in rotation. The detector 10 is connected to a counting rate meter 140, the output of which is applied to a recorder 150 through the control circuit 100. The output of a thermocouple 17 is applied to only the recorder 150 at an instant when the rotation of the goniometer is reversed. It is possible to record the output of the counting rate meter 140 during the time when the goniometer is rotated in either direction. If, however, the record of the output of the counting rate meter is limited with respect to a desired direction in the rotation of the goniometer, e.g. only recording the output of the counting rate meter when the goniometer is rotated clockwise, it is possible to eliminate the formation of an uneven pattern due to the lack of mechanical accuracy of the goniometer, thereby making it easier to observe the variation of the recorded pattern, the unit pattern of which is in the same direction.

The output of the thermocouple 17 is applied to a program setting circuit 160 and the voltage difference between the voltage representing the desired temperature of the sample at that time and the output of the thermocouple is amplified in a direct current amplifier 180. The output of the amplifier 180 is applied to a motor 201 for controlling a variable transformer 200. In such a manner if the temperature of the sample is lower than the desired temperature of the sample, the amplifier 180 will deliver a positive output therefrom, and the motor 201 will be caused to rotate so as to increase the output voltage of the transformer 200. On the other hand, if the temperature of the sample is higher than the desired temperature of the sample, the amplifier 180 will deliver a negative output therefrom, and the motor 201 will rotate reversely so as to decrease the output voltage of the transformer 200. Since the heating wire 5 for heating the sample is connected to the output of the transformer 200, as shown in FIG. 1, the temperature of the sample is automatically changed in accordance with the desired temperature curve. Since there is, however, some time lag in the operation of the motor 201, there is provided a deviation discriminating circuit 220 and a compensation circuit 240 in order to compensate the time lag. The deviation discriminating circuit will select appropriate contacts to be operated in the compensating circuit 240 in accordance with the polarity of the outputs of the amplifier 180, so that the compensating circuit 240 may automatically switch taps of the variable transformer 200 for a certain time so as to compensate the time lag of the motor 201, the time for switching the taps being adjusted automatically in accordance with the temperature of the sample.

FIG. 3 shows a wiring diagram of the goniometer and the recorder controlling circuit 100 according to the invention. Terminals 101 and 102 are connected to an electric source of the goniometer driving motor 13 and terminals 103 and 104 are connected to an electric source of a lamp 18 indicating the operations of the goniometer 1 and lamps 19 and 20 indicating the rotating direction of the goniometer 1. Terminals 105 and 106 are connected to an electric source of a relay 107. When manual switch 108 is closed, a relay 109 is operated so as to close switches 110, 111, 112 and 113, and the lamp 18 is lighted. If the contacts of the switches 114, 115, 116 and 121 are positioned as shown in FIG. 3, the motor 13 rotates, for example, to increase the angle of incident X-ray to the sample, and at the same time the rotating direction of the motor 13 is indicated by the lamp 19, and the output of a counting rate meter 140 is applied to a recording portion 151 in an automatic recording apparatus 150, then the X-ray diffraction pattern of the sample S is drawn on a recording paper which is fed by means of a motor 152.

When the stopper 15 contacts the limit switch 16 so as to open the same, a switch 118 is closed in accordance with the operation of a relay 117, and relay 107 is energized so as to close switch 119. Accordingly, a relay 120 is operated so as to switch over the contacts of the switches 114, 115, 116 and 121, and then the lamp 19 is extinguished and the motor 13 is reversely rotated. The reversed rotational direction of the motor 13 is indicated by the lamp 20, and the goniometer 1 begins to move so as to decrease the angle of incident beams to the sample at the same time. Thus the limit switch 16 is closed again, but the switch 119 is closed by the relay 107 until it is energized again; and the switch 119 will be opened when the relay 107 is energized again after the relay has been deenergized. Therefore, the reversing rotation of the goniometer 1 is maintained after the limit switch 16 is closed.

As mentioned above, since the relay 122 is returned back to its original condition if the limit switch 16 is opened, the switch 123 is opened and the switches 124 and 125 are switched over. Accordingly, if the terminals 126 and 127 are connected to the output of the thermocouple 17, the output voltage of the thermocouple is applied to the automatic recording apparatus 150 and the motor 152 for feeding the recording paper is stopped.

Thus, a straight line which indicates the sample temperature is drawn on the recording paper. If the limit switch 16 is closed and the motor 152 is driven in accordance with the reversed rotation of the motor 13, the output of the counting rate meter 140 is applied to the recording portion 151, and then the diffraction pattern is drawn on the recording paper.

When the stopper 14 contacts with the limit switch 16 in accordance with the rotation of the goniometer 1, immediately the motor 152 in the recording device 150 is stopped, the recording portion 151 receives the outputs of the thermocouple 17, and a temperature indicating line having no width is recorded on the recording paper. Furthermore, since the switch 119 is opened and the relay 120 is returned to its original position, and the goniometer 1 begins to move so as to increase the angle of incident X-ray to the sample. Therefore, the diffraction pattern formed by the change of the angle of incident X-ray within the limit which is defined by the position of the stoppers 14 and 15 is repeatedly drawn on the recording paper while the temperature indications are marked on each of the unit patterns. By operating manual switch 128, the temperature mark can be recorded on the pattern at any desired time, moreover, it is possible to record only the diffraction patterns without the temperature mark. Furthermore, if a manual switch 130 is positioned at its middle contact 130–2, the diffraction pattern is recorded regardless of the rotating direction of the goniometer 1.

If, however, the manual switch 130 is positoned for example, at its left contact 130–1, the relay 131 is operated when the switch 121 is positioned as shown in FIG. 3, a switch 132 being closed and a switch 133 being opened. Since, in this case, the motor 152 of the recording device 150 is stopped and the input of the recording portion 151 is short circuited, no recording of the pattern is effected.

If a contact of the switch 130 is positioned to the contact 130–3 in FIG. 3, the recording of the pattern may not be effected when the switch 121 is positioned to the contact 121–1. Accordingly, if the manual switch 130 is positioned to either the contact 130–3, the diffraction pattern may be repeatedly recorded on the recording paper only when the goniometer is rotated so as to increase or decrease the angle of incident X-rays to the sample.

FIG. 4 shows the program setting circuit 160 for the sample temperature. The both ends of a plurality of variable resistors 162–1, 162–2, 162–3, . . . 162–n are connected to an electric source 163 in parallel and a sliding contact of each of the variable resistors is connected to each tap of a principal variable resistor 161. A slidable conductor of the principal variable resistor 161 is driven in a fixed direction by a constant speed motor 164. Namely, if the sliding conductors of the variable resistors 162–1, 162–2, 162–3, 162–n are respectively adjusted to an appropriate portion of the corresponding potential, the electric potential on the principal resistor 161 is delivered in the desired form. Since the slidable conductor of the principal resistor 161 moves at a constant speed from one end to the other end, the voltage between the ground and the slidable conductor of the principal resistor 161 changes according to a desired curve. Therefore if the conductors of the switches 165 and 166 are positioned as shown in FIG. 4, the difference between the output voltage on the thermocouple 17 and the voltage on the slidable conductor of the principal resistor 161 is applied to a direct current amplifier 180. The voltages applied to the both ends of each of the slidable resistances 162–1, 162–2, 162–3, . . . 162–n are possible to be adjusted to the constant value with respect to the voltage of the standard cell 172 by regulating a variable resistance 167 so that the indication of the direct current amplifier 180 may be zero in changing the position of the conductors of the switches 165 and 166. Furthermore, if the conductors of the switches 168 and 169 changes their positions when a conductor of a switch 170 is suitably positioned, the difference of voltage between the voltage on the slidable resistor and the voltage on a precise slidable resistor 171 is applied to the amplifier 180. After setting the slidable conductor suitably in accordance with the graduation of the dial of the precise slidable resistor 171, if the output of the amplifier 180 is made zero by adjusting the slidable resistor which is selected by the switch 170, it is possible to set in the desired value the potential on the tap of the principal resistor. By repeating operation in this way, switching over the switch 170 successively, the electrical potential at each tap of the principal resistor can be set to the desired value.

FIG. 5 shows a circuit showing the portions of the transformer 200 and the compensating circuit 240 in FIG. 1 in detail. The input terminals 221 and 222 of a motor 201 for controlling the variable transformer 200 and of the deviation discriminating circuit 220 are connected to the output terminals of the amplifier 180, the output terminals 202 and 203 of the transformer 200 are connected to the heating wire 5 for heating the sample, and the voltage on the electric source of the vacuum tubes 206 and 207 is applied from the terminals 204 and 205. If, for example, the direct current amplifier 180 delivers a positive output which means that the sample temperature is lower than the desired temperature of the sample, the motor 201 rotates so as to increase the output voltage on the transformer 200, and if it delivers a negative output which means that the sample temperature is higher than the desired temperature of the sample the motor 201 rotates so as to decrease the output voltage of the transformer 200. At the same time, if the output of the amplifier 180 is positive, a relay 223 receives the output current from the deviation discriminating circuit 220; on the other hand, if the output of the amplifier 180 is negative, another relay 224 receives the output current. In operating the relay 223, the conductors of the switch 208 which is interposed between the taps of the variable transformer 200 and the switch 209 which is arranged at the grid circuit of the vacuum tube are switched in increase the control grid voltage of the tube 206, and therefore the tube is placed in the conductive condition and then the relay 210 is energized, the conductor of the switch 210 being switched. Accordingly, at the same time when a positive output voltage is delivered from the amplifiers 180, the position of the conductors of the switches 208 and 211 are changed so as to increase the voltage between the terminals 202 and 203, and the power for heating the sample is increased immediately. Thus, the sample temperature is elevated and then the difference between the sample temperature and the predetermined temperature given by the program setting circuit 106 is reduced. Furthermore, since in accordance with the change of the position of the conductor of the switch 209, a condenser 212 is changed through the variable resistances 213 and 214, the grid voltage of the vacuum tube 206 is gradually decreased and after a certain time the relay 210 returns to its original state, the switch 211 is returned to its original position.

Furthermore, since the output of the amplifier 180 is zero if the temperature of the sample equals the predetermined temperature thereof in accordance with the movement of the slider of the variable transformer 200 by operating the motor 201 slowly, the relay 223 is actuated to the original state, the conductors of the switches 208 and 209 are respectively moved to their position as shown in FIG. 5, the charge in the condenser 212 is discharged through the resistor 215. Furthermore, since the output voltage of the variable transformer 200 is applied to the transformer 225, the output of which is applied to the grid of the tube 206 and 207, the duration of the returning of the relay 210 depends on the output voltage of the variable transformer 200 which changes according to the temperature of the sample.

When the amplifier 180 delivers a negative output, the slidable conductor of the transformer 200 gradually moves so as to reduce the output voltage therefrom and at the same time the relay 224 operates so as to alternate the position of the conductors of the switches 216 and 217, then the tube 207 is placed in the conductive condition so that the relay 218 is energized and the conductor of the switch 219 is moved. Thus, the voltage on the heating wire 5 is instantaneously decreased and then the difference between the sample temperature and the predetermined temperature given by the program setting circuit 106 is reduced, after the constant period of time the conductor of the switch 219 is returned to the original position. When the temperature of the sample coincides with the predetermined temperature, the conductors of the switches 216 and 217 are returned to their original positions, respectively.

Although, in general, the actual thermal response of the heating device is increased as the temperature in the heating device is elevated, since the voltage compensating the deviation of the sample temperature is given from the taps of the transformer 200 in the compensating circuit shown in FIG. 5, the voltage is maintained constant regardless of the temperature of the sample. Therefore, the rate of the compensating power as against the heating power is reduced in accordance with the temperature rise of the sample and adapts to the increase of the thermal response of the heating device. Furthermore, since the transformer 225 is connected to the heating wire in parallel, the outputs of the transformer 225 are applied to the grids of the tube 206 and 207 and the duration of time for supplying the compensating power is adjusted by means of these tubes, the time of the supply for the compensating power to the heating device may be automatically controlled by the amount of the heating power to the sample. Namely, the time for the supply of the compensating power to the heating device is automatically controlled in accordance with the amount of the thermal response in the heating device.

FIG. 6 shows an example of the recorded diffraction pattern in accordance with the system of the present invention. In this example, the sample is an aluminium-zinc alloy which consists of 50% aluminum and 50% zinc. The stoppers 14 and 15 of the goniometer are respectively set to the angles of 42° and 47° so as to change the angles between X-ray incident and diffracted beams within such angles. The temperature of the sample is continuously elevated from about 270° C. to 350° C. and the rate of the rotation of the goniometer is 4° per minute. The recording paper was fed at a speed of 4 cm. per minute. The X-ray tube used in this example is of the copper target type and has a peak voltage of 40,000 volts, 20 mA. current being supplied to the tube. Only $K\alpha$-ray was projected to the sample. In the patterns shown in FIG. 6 the straight lines $t_1$, $t_2$, $t_3$ are the temperature marks which indicate the sample temperature in accordance with their length and, by jointing of the tops of these lines, a temperature curve can be obtained. Accordingly, the temperature of the sample corresponding to the peak $\alpha$ in the diffraction patterns is obtained by reading the temperature curve.

In temperatures lower than 275° C., the alloy mentioned above forms the two-phase mixture of the face-centered cubic lattice of aluminium and the closed packed hexagonal lattice of zinc. If it exceeds a temperature of 275° C., the alloy forms the state of coexistence in two phases of the face-centered cubic lattice which are different from each other in the lattice constant, and if the temperature in the alloy is elevated to over about 320° C., the lattice constants of both phases coincide with each other because the alloy forms a single phase, of the face-centered cubic lattice.

From the pattern shown in FIG. 6, it is clearly observed that the peak $\beta$ of the pattern suddenly is eliminated (at a temperature corresponding to 275° C.) and that the peaks $\alpha$, $\alpha'$ corresponding to two phases of the face-centered cubic lattice gradually coincide with each other.

FIG. 7 shows the diffraction pattern traced on recording paper which is fed at a speed of ¼ cm. per minute, when the temperature of the sample is elevated from the room temperature to 350° C. and is lowered from 350° C. to the room temperature slowly. The operational conditions used in recording this pattern are the same as the conditions used in the example with reference to FIG. 6 except the feeding speed of the recording paper.

FIG. 7 a group of lines denotes the temperature of the sample, a group of lines $\beta_0$ represents the diffraction pattern with respect to zinc in phase $\beta$, a group of lines $\alpha_0$ represents the diffraction pattern with respect to aluminium in the phase $\alpha$ and a group of lines $\alpha_0'$ represent the diffraction pattern with respect to aluminium in the phase $\alpha'$. From FIG. 7 it is possible to observe the phase disappearance of zinc, its reappearance and its hysteresis character. In FIG. 6 and FIG. 7 the magnitude of the temperature is denoted by the temperature scale T.

What we claim is:

1. A system for continuously recording X-ray diffraction patterns from a sample comprising means for heating said sample, means sensitive to the sample temperature for producing electrical signals corresponding to said temperatures, means for irradiating the sample with X-rays, means for continuously and repeatedly varying the angle of incidence of said X-rays on said sample, said X-rays being diffracted by said sample, means operatively positioned relative to said sample to receive said diffracted X-rays and to translate the same into electrical signals which correspond in magnitude to the intensity of said diffracted X-rays, recording means responsive to the electrical signals corresponding to the temperature of the sample and to the electrical signals corresponding to the diffracted X-rays for recording the temperature of the sample and the X-ray diffraction pattern of the sample, means for varying the quantity of heat furnished to said sample for varying the temperature thereof, means for controlling the electrical signals corresponding to the diffracted X-rays as they are furnished to the recording means and while the angle of incidence of the X-rays is continuously varied in a first direction, and means for instantaneously furnishing the electrical signal which corresponds to the temperature of the sample to the recording means at the instant when the angle of incidence of the X-rays is reversed in direction.

2. A system in accordance with claim 1, in which said specimen heating means is connected to the means for controlling the heat supply for said heating means so that the output of said temperature detecting means coincides with the reference amount which is changed by a desired program.

3. A system in accordance with claim 2, in which said controlling means consists of a plurality of resistors having a slidable contact, both ends of each of said resistors being connected to an electric source in parallel, a further resistor having a plurality of taps and a slidable contact, said slidable contacts of the first mentioned resistors being respectively connected to said taps, and means for moving said slidable contact of the second mentioned resistor at a predetermined constant speed.

4. A system in accordance with claim 2 comprising means for comparing the output signal from said temperature detecting means with the reference amount which is changed by a desired program and means by which compensation power appropriate to the thermal response of the said heating means at various elevated temperatures is applied automatically to said heating means and the output signal of said temperature detecting means can be rapidly brought in coincidence with the said reference amount.

References Cited in the file of this patent

UNITED STATES PATENTS

| 2,479,471 | Champaygne | Aug. 16, 1949 |
| 2,615,136 | Evans | Oct. 21, 1952 |
| 2,713,125 | Geisler | July 12, 1955 |
| 2,753,458 | Kazato | July 3, 1956 |

OTHER REFERENCES

X-Ray Studies of the Thermal Expansion of Bismuth Single Crystals, Goetz et al., The Physical Review, Second Series, Vol. 40, No. 5, June 1, 1932.

X-Ray Diffraction Procedures, Klug and Alexander, John Wiley & Sons, Inc., 1954, pp. 226–234.